Aug. 10, 1948.  J. N. TYNAN  2,446,893
LAMINATED CONSTRUCTION
Filed Oct. 6, 1943  3 Sheets-Sheet 1
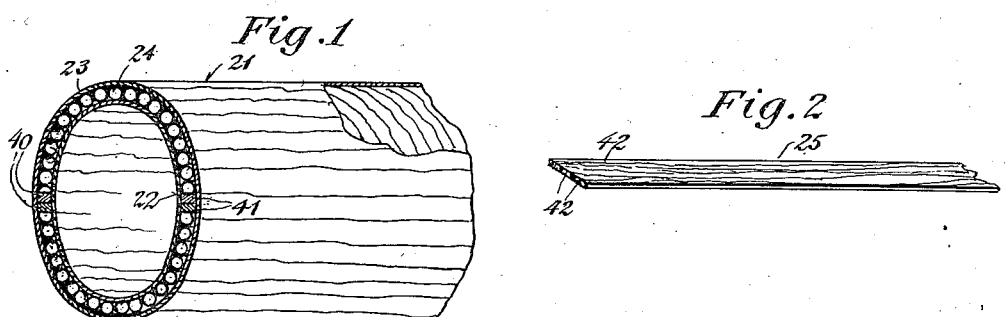
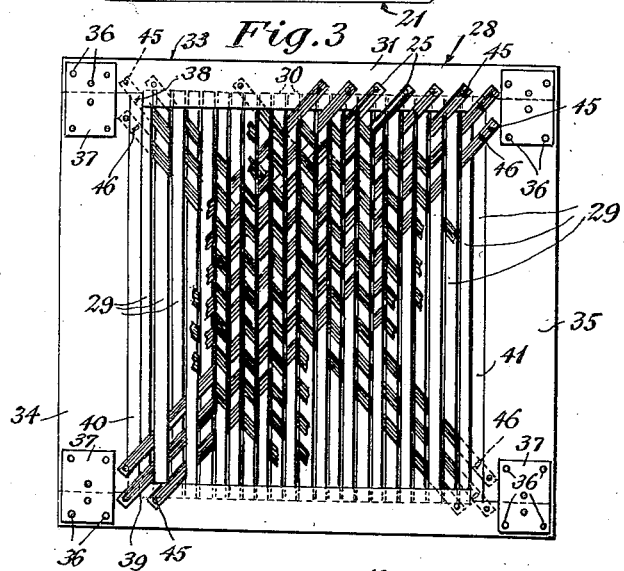
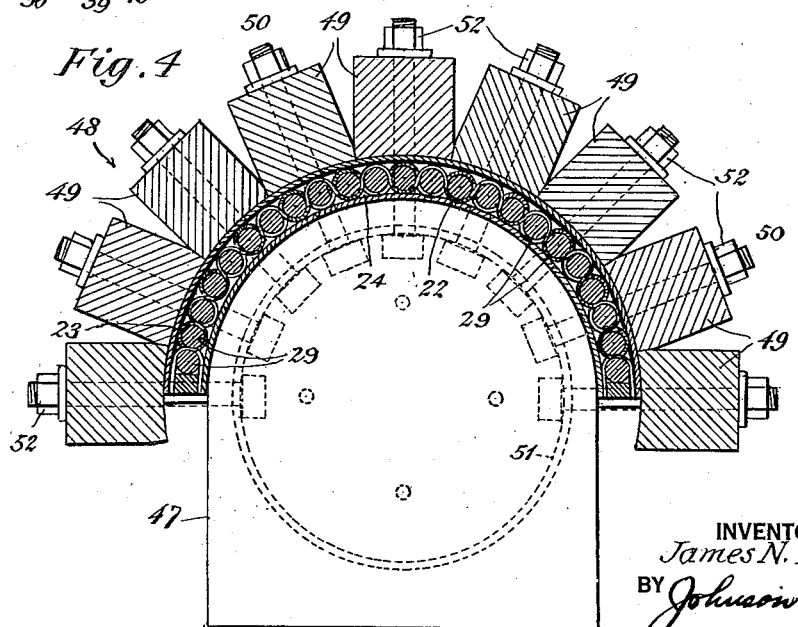
INVENTOR
James N. Tynan,
BY Johnson + Kline
ATTORNEYS Aug. 10, 1948.　　　　　J. N. TYNAN　　　　　2,446,893
LAMINATED CONSTRUCTION
Filed Oct. 6, 1943　　　　　　　　　　　　　　3 Sheets-Sheet 2
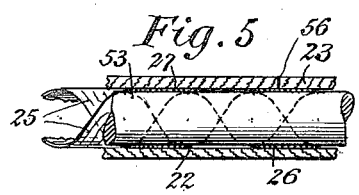
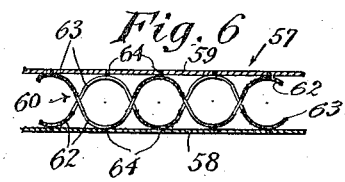
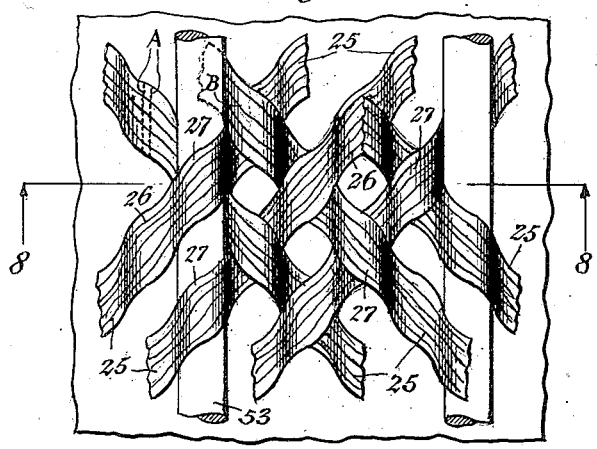
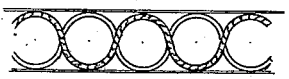
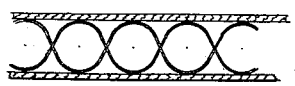
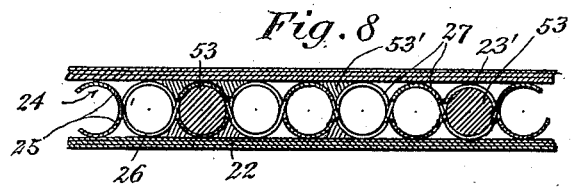
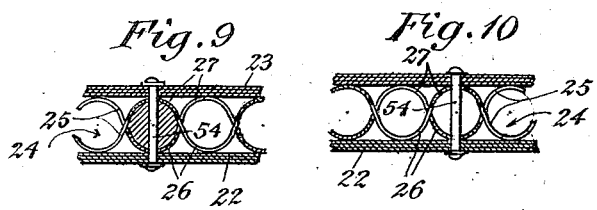
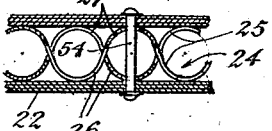
INVENTOR
James N. Tynan
BY Johnson + Kline
ATTORNEYS Aug. 10, 1948.  J. N. TYNAN  2,446,893
LAMINATED CONSTRUCTION
Filed Oct. 6, 1943  3 Sheets-Sheet 3

INVENTOR
James N. Tynan,
BY Johnson + Kline
ATTORNEYS

Patented Aug. 10, 1948

2,446,893

UNITED STATES PATENT OFFICE 2,446,893

LAMINATED CONSTRUCTION

James N. Tynan, Chicopee, Mass., assignor to A. G. Spalding & Bros. Inc., Chicopee, Mass., a corporation of Delaware Application October 6, 1943, Serial No. 505,153

23 Claims. (Cl. 20—91)

This invention relates to improvements in laminated constructions, especially constructions of the class including opposed wall or skin sections having secured therebetween and thereto a core section including corrugated sheet or strip material. This application is a continuation in part of application Serial No. 461,907 filed October 13, 1942, which has become abandoned.

It is an object of the present invention to provide a construction of the foregoing class which has improved general all over strength, has improved characteristics of torsional, impact and shearing strength, which may be readily fabricated and which has divers uses, as for example, in the construction of aircraft hulls, fuselage, wings and wing ribs, and of pontoons, boat hulls, doors and panels.

Another object of the invention is to provide a very efficient and effective method of making the improved construction embodying the present invention.

A feature of the invention resulting in the attainment of the foregoing, and other objects, resides in the provision of a laminated construction in which the core section includes strip material which not only is corrugated to provide longitudinally related oppositely offset portions adapted to alternately engage opposite of the outer wall or skin sections, but which also is crisscrossed in such a way that oppositely offset portions of crossed strips are disposed at the crossings to provide not only an advantageous staggering of corrugations of crossed strips with the attendant effect of X-type supports intermediate the skin or wall sections but also an advantageous effect of a plurality of pairs of directly opposed arch- or bridge-type supports intermediate the skin or wall sections, the collective effect of the supports and the manner of their disposition being such that there is no weakened shear or break line running in any direction transverse the skin or wall sections and through the core section.

Another and related feature of the invention resides in the forming of and association of the corrugated strip material, and the association of the same with the skin or wall sections, in such a way that the corrugated strips engage the wall or skin sections at an angle to the longitudinal axis of the strips, and that portions of the strips connecting the offset portions alternately engaging opposite of the wall sections have a longitudinal twist crosswise of the respective strips, to provide further strengthening of the supports effected between the wall or skin sections.

Other features of the invention reside in the forming of the corrugated sheet material embodied in the core section, of wood strips having continuous edge grain extending through the thickness of and running longitudinally of the strips, and in the forming and disposition of these strips in such a way that engagement of the wall sections and the strips is at an angle, advantageously a relatively sharp angle, to the longitudinal grain of the latter.

In another form of the present invention, a different core member is located between the outer skins and bonded thereto. The core member preferably comprises a pair of corrugated sheets disposed on opposite sides of a center skin with the corrugations extending in opposite directions and at an acute angle to the longitudinal axis of the panel. With these elements secured together, a unit having diagonally extending supports intermediate the skin or the wall sections will be formed. This unit will resist any twist or torsion and there will not be any weakening shear or break lines running in any direction transverse of the skin or wall sections. The center skin between the two corrugations may preferably have its grain disposed at 90° to the grain of the outer skins.

Other features of the invention reside in the provision of a laminated construction of the class described, embodying and making possible an advantageous joint between adjoining units, and in the provision of reinforcing elements located in and extending longitudinally of the passages defined by the corrugations of the core section.

Another feature of the invention resides in the provision of a laminated construction including outer wall sections of sheet metal and an inner core section, the corrugated and twisted strips of which are metal strips, alternately secured to opposite of the wall sections or of wall sections of metal and core of wood or vice versa.

Other objects and features will hereinafter appear.

In the drawings:

Figure 1 is a perspective view showing a structure embodying the construction of the present invention.

Fig. 2 is a perspective view showing a wood strip from which is formed corrugated strip material included in the core section of a construction embodying the present invention, and particularly illustrating the disposition of the grain therein.

Fig. 3 is a view illustrating the manner in which the core section may initially be formed by winding the strips on a winding jig.

Fig. 4 is a sectional view illustrating the manner of forming a curved unit embodying the laminated construction of the present invention.

Fig. 5 is a sectional view illustrating an advantageous joint of two units embodying the present invention.

Fig. 6 is a semidiagrammatic sectional view illustrating a laminated construction of metal sheet and strip material embodying features of the present invention.

Fig. 6A is a view similar to Fig. 6 showing a metal skin combined with a wood core.

Fig. 6B is substantially the same as Fig. 6 showing a wooden skin with a metal core.

Fig. 7 is a view, with one of the wall sections removed, and with certain of the parts broken away, illustrating a fragmentary portion of a unit embodying the construction of the present invention.

Fig. 8 is a sectional view, semidiagrammatic, taken substantially on the line 8—8 of Fig. 7, illustrating a flat as distinguished from a curved unit embodying the present invention.

Figs. 9 and 10 are fragmentary semidiagrammatic sectional views, similar to Fig. 8, but illustrating modifications of the present invention.

Fig. 11 is a detail view showing the twist in those portions of a corrugated strip connecting the oppositely offset portions.

Figure 13:
Fig. 13 shows a sectional view through that part of the panel of Fig. 12 in which the corrugations in the two sheets are in alignment.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring more particularly to the drawings there is shown in Fig. 1, for the purpose of illustrating a preferred embodiment of the present invention, a pair of like units 21 each employing the construction of the present invention.

As shown in Fig. 1, the units are curved and suitably joined together, as by a suitable adhesive, to provide a generally cylindrical construction, such as might be used in the making of a part of the fuselage and/or tail of an aircraft. It is to be understood, however, that the present invention in its broader aspects is not limited to the employment of cylindrical constructions, or of one or any number of units, be they curved as shown in Fig. 1 or of a generally flat contour as shown in Fig. 8, or of other contours.

Similarly to prior proposals, units embodying the present invention include spaced outer wall or skin sections 22 and 23 secured to an intermediate core section 24 including corrugated sheet material. As shown, the outer wall sections each may be and preferably are, if the unit be of wood, made up of a plurality of layers of relatively thin wood sheets adhesively bonded together with the grain in adjacent superposed sheets in angularly disposed or crisscrossed relation as illustrated in Fig. 1.

Of particular importance, however, it is to be noted, as shown best in Figs. 7 and 8, the corrugated sheet material is in the form of corrugated strips 25 disposed in crisscrossed relation, each with a series longitudinally related oppositely offset portions 26 and 27 alternately engaging opposite of the wall sections 22 and 23, and with oppositely offset portions of crossed strips disposed in directly opposed relation intermediate the outer wall sections and secured thereto, providing a plurality of opposed arch or bridge type supports for the latter and also providing a plurality of what are in effect X-type supports between the wall sections by the crossing, when viewed edgewise as in Fig. 8, of the portions of the strips which interconnect the respective oppositely offset portions.

In forming the core section 24, above described, there advantageously may be employed a winding jig 28, such as shown in Fig. 3, which includes a plurality of winding bars 29 disposed in side-by-side relation with their ends located in suitable sockets 30 in like side pieces 31 and 32 of a frame part 33 of the jig. Extending intermediate the side pieces 31 and 32 adjacent opposite ends thereof are other side pieces 34 and 35 which are separably connected to the side pieces 31 and 32 by screws 36 or other suitable fastening means passing through connecting plates 37 lapping adjoining side pieces. Located and gripped between shoulders 38 and 39 of the side pieces 31 and 32 on the one hand and the adjacent side pieces 34 and 35 on the other hand, are fastening pieces 40 and 41 disposed at opposite sides of the plurality of winding bars 29.

Before winding the strips 25 on the jig, the strips, if of wood, preferably are first soaked in hot water at approximately 150° F. to insure free and easy bending and to permit a set in the desired position or shape. Moreover, and of particular importance, if the strips be of wood they are advantageously cut from boards or planks which in turn have been slash sawn from logs, to produce, as shown best in Fig. 2 a strip 25 with continuous edge grain 42 extending through the thickness thereof and running longitudinally thereof throughout and in the direction of its length. Strips with the grain so disposed therein, have improved bending characteristics, as compared, for example, with strips of flat grain stock, and provide greater strength, particularly at each arch or bridged portion. Ash provides a very satisfactory wood strip for use in the construction, but it will be appreciated that other woods may be employed without departing from the present invention.

It now appears that the thickness and width of the core section strips will be in substantially direct relationship to the diameter of the forming bars and the distance they are placed apart in the forming jig. Thus, for example, a $\frac{1}{32}$ inch by ¾ inch strip can be wound diagonally at a 45° angle on ¾ inch diameter forming bars placed approximately ⅛ inch apart, while it would appear that a $\frac{1}{16}$ inch by ¾ inch, or a ⅛ inch by ¾ inch, strip also could be bent over a ¾ inch forming bar if the bars be placed further apart in the forming jig. In other words, it now appears that the diameter of the forming bar provides the preferred maximum limit for the width of the strips. Hence, with a ¾ inch diameter forming bar, up to ¾ inch wide strip could be used, while with a 1 inch diameter bar up to a 1 inch wide strip could be used, while the thickness of the strips would be limited primarily by their failure to bend without breaking at the particular diameter of bar used.

In forming the core section 24 on the jig, as shown in Fig. 3, the strips are wound diagonally from corner to corner, the first two being woven to cross at the center section and on the center bar of the forming jig at a 45° angle. The other strips are then wound in a like manner, one series of strips running parallel to one of the first woven strips and another series of strips running parallel to the other of the first woven strips, and, of importance, with all of the strips running diagonally in one direction relative to the forming bars going over and under each of the forming bars in the same manner or relationship, and with all of the strips running diagonally in the other direction relative to the forming bars going over and under each of the bars in the same manner, but alternately with respect to the strips in the first series.

With this manner of winding, any two crossing strips will be so disposed that one will be over and the other under the same forming bar at the crossing of the strips, thereby forming a pair of directly opposed arch or bridge type supports as hereinabove explained in connection with the completed laminated unit 21.

Moreover, and also of importance, in the winding of the strips diagonally relatively to the forming bars, portions 43 and 44 of each of the strips connecting one offset portion with longitudinally leading and following portions oppositely offset relative thereto, are given equal but opposite longitudinal twists crosswise of the strips, see Fig. 11 and the strips are so disposed that they are adapted to engage the respective outer skins at an angle, advantageously a relatively sharp angle, to the longitudinal axis of the strips, as shown in some cases by dotted lines A and B for illustrative purposes in Fig. 7, and to the longitudinal grain of the strips. A further strengthening of the arch type supports is thus provided.

As shown in Fig. 3, the ends of the respective strips are initially and temporarily secured to the side pieces 31, 32, 34 and 35 of the jig frame 33, as by tacks 45, to hold the strips in place and for setting on the jig. Also, and as shown, suitable means, such as staples 46 are used to secure the strips at one side of the jig to the fastening piece 40 and at the opposite side of the jig, crosswise of the bars, to the fastening piece 41. While the jig, as shown, is not completely wound with the strips, it will be readily appreciated that upon a completion of the winding operation it would be.

To assemble the core section 24 and the outer wall sections 22 and 23, the several side pieces of the jig frame 33 are removed, as by withdrawing the screws 36, and the crossed strips, carried by the fastening pieces 40 and 41 and forming bars 29, are placed between the wall sections 22 and 23 in a suitable press where the several sections of the unit are firmly and evenly pressed together. Suitable adhesive, such as hot glue, cold setting casein, hot or cold urea formaldehyde or thermo setting phenol resin, which has previously been applied to the inner surfaces of the wall sections and to the outer surfaces of the offset portions of the strips, is thus caused to firmly and securely bond the core section to the wall sections at the plurality of locations where the offset portions of the strips engage the latter. Advantageously, the areas of engagement and bond, as defined between the dotted lines A in Fig. 7, of the core and wall sections, may be maximized by the impression of slight indentations in the inner surfaces of the wall sections, as indicated, for example, at 22' and 23' in Fig. 8, by the offset portions during the pressing operation.

The contour of the press, it will be readily appreciated, will be determined by the shape of the resulting laminated unit, be it flat, as shown in Fig. 8, or curved as shown in Fig. 1.

An example of a press used with success in the forming of curved units, such as shown in Fig. 1, is shown in Fig. 4 for illustrative purposes. It includes a base form 47, having a working contour corresponding to that of one of the outer wall sections 22 of the completed unit. On this base form is first laid the wall section 22, which preferably and advantageously has been given a preset in substantially its ultimate desired contour. Then the core section 24, still carried by the forming bars and fastening pieces is placed on top of the first placed wall section. Following this operation the other wall section 23, which like the first wall section 22 preferably and advantageously has been preset to substantially its ultimate desired contour, is placed on top of the core section which of its own weight substantially conforms to the general contour of the base form.

With the several sections of the laminated unit in place, the movable or clamping section 48 of the press is clamped down to effectively press the sections together and cause an effective bond therebetween due to the action of the adhesive as above described.

As shown, this clamping section of the press includes a plurality of sidewise abutting beams 49 extending longitudinally of the base form, and like the latter, beyond the ends of the laminated unit being pressed therebetween. A series of tightening bolts 50, extending radially out from suitable carrying flanges, such as the flange 51 shown, suitably secured to opposite ends of the base form, and passing through the respective beams to receive tightening nuts 52, provide an effective means for drawing the beams down into clamping engagement with the wall section 23. As the pressing faces of the beams are curved according to the ultimate desired contour of the unit, it will be readily appreciated that a firm and continuous clamping of the unit is achieved. Upon setting of the adhesive, the unit is taken from the press, the forming bars removed, and a unit, such as one of the units 21 shown in Fig. 1 is completed.

Such a unit, be it flat or curved, due to the directly opposed arch or bridge type supports, the X-type supports, the diagonal interweaving of the strips, the special twist of the corrugated strips, the angular contact or engagement of the strips with the outer skin sections, and the bonding tie up of all of the strips with each other through bonding engagement with the outer skins, it will be appreciated, is of particularly strong integrated construction, and tends to and does distribute impact, torsional and other strains and stresses throughout divers corrugated strips making up the core section regardless of the direction of the force to which the unit is subjected and regardless of the point or points at which that force is applied. Moreover, the described and preferred disposition of the grain, if wood be used, serves to add further strength to the unit as a whole.

In certain uses, should additional reinforcement of a unit be desired, it is contemplated that reinforcing members 53, as shown in Figs. 8 and 9, which may be barlike and either of tubular or nontubular construction, may be inserted in the core section longitudinally of the passages defined by the oppositely offset portions disposed at the crossings of the crossed strips. Advantageously, these barlike reinforcing members may be constructed as are the tubular structural members illustrated in my copending application, Serial No. 461,906, filed October 13, 1942 and titled Improvement in laminated tubing Patent No. 2,382,834 granted August 14, 1945, or they may be of other construction.

If desired, these reinforcing members may be disposed in position by substituting one or more of the same for one or more of the forming bars in the core section winding jig 28 and by not removing the same after the several sections of the unit are pressed together in the press. Adhesive applied to the reinforcing members before the winding operation would thus effect a secure and effective bond between the reinforcing members and the core section at the crossings of the corrugated strips in the latter when the unit is clamped in a suitable press.

Alternately, or in addition to the manner above described of securing the reinforcing members in place, and as shown in Fig. 9, rivets 54 passing through the outer skin sections, the reinforcing members and corrugated strips at the crossings of the latter, may be used to secure the reinforcing members in position. Moreover, these rivets would serve to further strengthen, and to tie together and to secure together in effective integrated relation, the several sections of the unit. Thus, as shown in Fig. 10, rivets may be employed even though no reinforcing members 53 be used, or at locations in a unit where no reinforcing members are employed.

If desired and as shown, for example, in Fig. 8, supporting and holding members 53', as of wood or other suitable material, may be employed for providing additional strength. These members, which are preshaped to fit in the outside valleys defined between the corrugations and extend across the core section in the same direction as the reinforcing members 53, are located in position after the forming of the core section and before the core and wall sections are pressed together in the bonding operation. Suitable adhesive applied to the surfaces of the members 53', which may be placed in valleys at both sides of the core section, and either in all of the valleys or in selected valleys, serves to effectively tie together and integrate the wall sections, corrugated strips and members 53'. It will be appreciated that these members 53' may be used in constructions which do not include the reinforcing members 53 as well as in constructions in which the reinforcing members are used, and in constructions embodying any or all of the illustrated forms of the invention.

As shown in Fig. 5, the construction of the present invention lends itself admirably to the provision of effective joints between adjacent units which may be employed in making up a larger structure. As there shown, adjacent units are formed with one unit having one of its outer wall sections with a portion 55 extending beyond the core section and opposite wall section thereof, and with the adjoining unit formed with one of its outer wall sections set back at 56 from the edge of the core section and opposite wall section thereof, the two units being joined together with the extending portion 55 of the wall section of the first unit, overlapping and adhesively secured to the initially exposed portion of one face of the core section of the second unit. Advantageously one or more reinforcing members 53, disposed in the manner above described in connection with Figs. 7 and 8, may be employed to extend across the lapped joint between the adjoining units.

The construction of the present invention, therefore, it will be readily appreciated, is well adapted for use in the sectional manufacture of aircraft hulls, boat hulls, and glider hulls, and of other products.

While as described above, the construction of the present invention is particularly adapted to units of wood, it is also contemplated that the units embodying features of the invention may be made from other suitable materials having the desired properties of structural strength and sustaining characteristics. Thus, as shown in Fig. 6, a modified unit 57 including outer wall sections 58 and 59 of sheet metal and an intermediate core section 60 of corrugated metal strips 61 may be employed, the metal corrugated strips being disposed in crisscrossed relation and having longitudinally related oppositely offset portions 62 and 63 alternately engaging opposite of the wall sections, and with the corrugated strips being formed to include opposite but equal longitudinal twists and to engage the outer wall sections in the same manner as the strips in the core sections shown in Figs. 1, 7 and 8. Formation of the core section 60 of metal strips may be effected on a suitable jig in a manner similar to that described in connection with Fig. 3. Securement of the core section to the outer wall sections, advantageously is effected at the crossing of the strips, as by welding, such for example as by spot welding as shown at 64, the outer skin or wall sections to the oppositely offset portions of the crossed strips, as by using suitable opposed electrodes located respectively in the core section and on the outer faces of the wall sections. It may be desired to secure metal skins to wooden core members as shown in Fig. 6A or wooden skins to metal cores as shown in Fig. 6B. This may be accomplished by bonding the wood to the metal with "Cycloweld," an adhesive developed by Chrysler Research Laboratories or "Bostic," a metal to wood phenolic base cement manufactured by B. B. Chemical Company. It is to be understood, however, that other means may be employed to bond or otherwise effectively integrate the wall sections and the core section at the crossings of the corrugated strips making up the latter.

Figure 12:
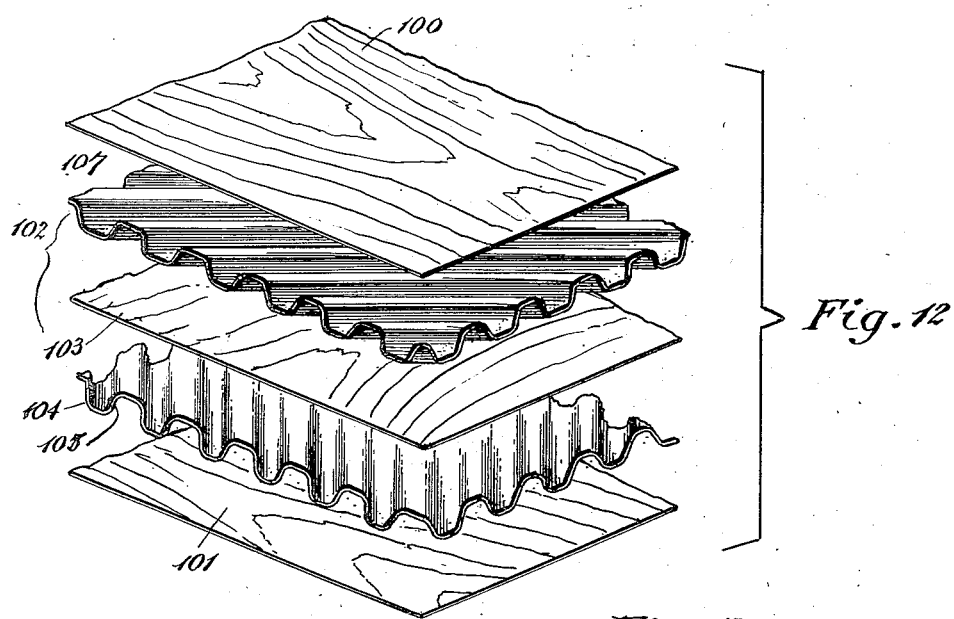
Fig. 12 shows an exploded view of a corner of the panel of another form of the invention.

In the form of the present invention disclosed in Fig. 12 showing the exploded view of a corner of a panel, the rigidity of the panel and the resistance to torsion is obtained by providing between the two outer skins 100, 101, a core member 102 comprising a center skin 103 having on each side thereof a corrugated member 104, 105. As indicated in the drawings, the corrugations extend at an angle to the longitudinal axis of the panel and run in opposite directions, each forming an acute angle with the longitudinal axis of the panel. It is at present preferred to have the corrugations disposed at 45° with respect to the axis of the panel. However, this may be varied between 30° and 60°.

While the outer and center skins may be of metal, in the herein illustrated form of the invention they are shown to be of plywood with the grain of the outer skins running with the longitudinal direction of the panel, while the center skin has its grain running transversely of and preferably at 90° with the grain of the outer skins.

Figure 17:
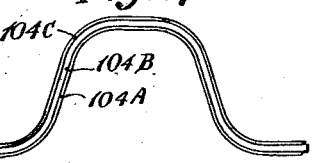
Fig. 17 shows a detail end view of one of the corrugations of the sheet.

The corrugated members 104, 105 may be made of various materials such as wood or metal. In the preferred form of the invention, they are made of 3-to-6-ply plywood and are corrugated at right angles to the grain in the outer plies. Fig. 17 shows an end view of one corrugation of a sheet 104 showing the plywood 104A, 104B and 104C consisting of 3 plies.

When the core and walls are assembled in the manner illustrated in Fig. 12 and secured together by suitable adhesive as specified above, a very rigid structure is provided having diagonally extending stress members which resist any torsion on the panel.

Figure 14:
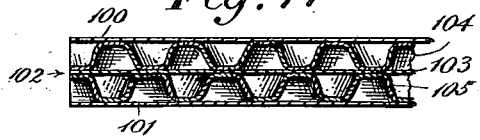
Fig. 14 is a sectional view through the panel at the point where the corrugations are opposed.

Figs. 13 and 14 show sectional views taken through the panel and show that at predetermined points along the panel, the corrugations will be in opposed relation as shown in Fig. 14 to provide an X type support, while at other points they will provide an aligned support as shown in Fig. 13.

When the structure is made of plywood or light metals, it will form a particularly strong unit and will, because of the diagonal arrangement of the core elements, distribute impact, torsional and other stress or strain throughout the panel.

Figure 15:
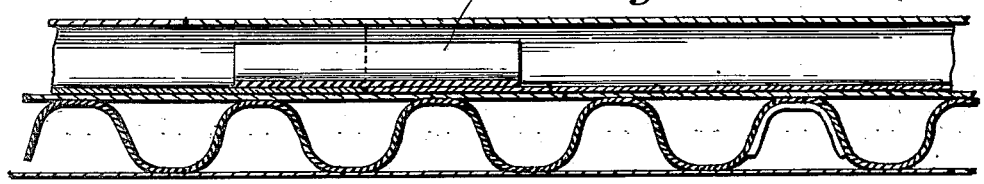
Fig. 15 shows a view of a joint in the section showing another form of joining means.
Figure 16:
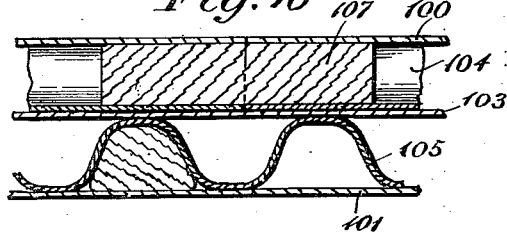
Fig. 16 shows a fragmentary sectional view similar to Fig. 15 showing another form of joining means.

The panels may be joined together in a manner similar to that shown in Fig. 5 by splicing the skins and by connecting the corrugations by sections 106 cut from other similar corrugated sheets as shown in Fig. 15, or by blocks 107 shaped to fit the corrugations as shown in Fig. 16.

With the type of connector shown in Fig. 15, a rod or the like member is disposed in the corrugation so that when pressure is applied to the superposed elements, it will hold the section of corrugation in engagement with the surface of the corrugated sheet and overlie the joint between the sheets to form a rigid connection therebetween.

In the form shown in Fig. 16, the block is milled or otherwise cut to substantially the shape of the corrugation so that as the sheets are formed, the pressure will hold the block in engagement with the surface of the corrugated material so that it will be secured in position, thus forming an effective joint between the two sections of corrugated material.

Variations and modifications may be made within the scope of this invention and portions of the improvements may be used without others.

Having thus described the invention, what I claim as new is:

1. In a construction of the class described the combination of opposed and spaced skin sections; and an intermediate core section providing a reinforcing and supporting structure, said core section including a plurality of crisscrossed diagonally extending strips respectively having longitudinally related portions oppositely offset with respect to each other and alternately bonded to said spaced skin sections, with oppositely offset portions in crisscrossed strips overlying and underlying each other at crossings of the strips.

2. In a construction of the class described the combination of opposed and spaced skin sections; and an intermediate core section providing a reinforcing and supporting structure, said core section including a plurality of crisscrossed strips respectively having longitudinally related portions oppositely offset with respect to each other and alternately bonded to said spaced skin sections, with oppositely offset portions in crisscrossed strips overlying and underlying each other at crossings of the strips, said offset portions in the respective strips being connected by portions having a longitudinal twist therein.

3. In a construction of the class described the combination of opposed and spaced skin sections; and an intermediate core section providing a reinforcing and supporting structure, said core section including a plurality of strips in crisscrossed relation, said crisscrossed strips respectively having longitudinally related portions oppositely offset with respect to each other and alternately bonded to said spaced skin sections, said offset portions in the respective strips being connected by portions having a longitudinal twist therein.

4. In a construction of the class described the combination of opposed and spaced skin sections; and an intermediate core section providing a reinforcing and supporting structure, said core section including a plurality of strips in crisscrossed diagonally extending relation, said crisscrossed strips respectively having longitudinally related portions oppositely offset with respect to each other and alternately bonded to said spaced skin sections.

5. In a construction of the class described the combination of spaced wall sections of plywood; and an intermediate core section providing a reinforcing and supporting structure, said core section including a plurality of corrugated strips of wood in crisscrossed relation longitudinally thereof, said strips having continuous edge grain extending through the thickness and running longitudinally thereof, and said crisscrossed strips having oppositely disposed corrugations at their crossings respectively facing and bonded to said wall sections.

6. In a construction of the class described the combination of opposed and spaced wall sections; and an intermediate core section, said core section including diagonally extending corrugated wood strip material having longitudinally related portions oppositely offset relative to each other and bonded to said respective wall sections, said wood strip material having continuous edge grain extending through the thickness and running longitudinally thereof.

7. In a construction of the class described the combination of opposed and spaced outer wall sections; and an intermediate core section bonded to said wall sections, said core section including a plurality of crisscrossed corrugated strips having longitudinally related portions oppositely offset relative to each other and alternately engaging opposite outer wall sections, said engaging portions being connected in sequence by connecting portions respectively having opposite longitudinal twists therein.

8. In a construction of the class described the combination of opposed and spaced outer wall sections; and an intermediate core section, said core section including a plurality of crisscrossed corrugated strips, said strips having longitudinally related portions oppositely offset relative to each other and alternately engaging and secured to opposite of said outer wall sections, with oppositely offset portions of crossed strips being disposed at the crossings to provide a plurality of pairs of opposed arch type supports for said outer wall sections, and with oppositely offset portions of the respective corrugated strips connected in sequence by portions having substantially equal and opposite twists longitudinally of the strips.

9. In a construction of the class described the combination of opposed and spaced wall sections; and an intermediate core section of corrugated sheet material having a longitudinal axis, said corrugated sheet material having longitudinally related portions alternately engaging and secured to opposite of said wall sections, said alternately engaging portions being connected in sequence by portions having a twist longitudinally of the sheet material, engagement of said wall sections and said sheet material being along a band disposed at an acute angle relative to the longitudinal axis of the latter.

10. In a construction of the class described the combination of opposed and spaced wall sections; and an intermediate core section, said core section including a plurality of corrugated wood strips disposed in crisscrossed relation, having longitudinally related oppositely offset portions alternately engaging opposite of said wall sections and with oppositely offset portions of crossed strips disposed at the crossings to provide a plurality of pairs of directly opposed arch type supports for said wall sections, said strips having continuous edge grain extending through the thickness and running longitudinally thereof, said alternately engaging portions being connected in sequence by portions having a twist therein longitudinally of the respective strips, and engagement of said wall sections and the respective strips being along a band disposed at an acute angle to the longitudinal axis and grain of the latter.

11. In a construction of the class described the combination of opposed and spaced wall sections; and an intermediate section including a plurality of corrugated strips disposed in crisscrossed relation, having longitudinally related oppositely offset portions alternately engaging and secured to opposite of said wall sections and with oppositely offset portions of crossed strips disposed at the crossings, forming a plurality of pairs of opposed arches defining passages extending angularly transverse the strips intermediate the wall sections; reinforcing members extending through at least some of the passages; and means for securing said members relative to said wall sections at the crossings of the strips.

12. In a construction of the class described the combination of opposed and spaced wall sections; and an intermediate section including a plurality of crisscrossed corrugated strips having longitudinally related oppositely offset portions alternately engaging opposite of said wall sections and with oppositely offset portions of crossed strips being disposed at the crossings to form a plurality of pairs of opposed arch type supports for said wall sections, said alternately engaging portions of the respective strips being connected by portions having a twist therein longitudinally of the strips, and said wall sections engaging said strips along a band disposed at an acute angle relative to the longitudinal axis of the latter.

13. In a construction of the class described the combination of opposed and spaced wall sections; and an intermediate section including a plurality of corrugated strips disposed in crisscrossed relation, having longitudinally related oppositely offset portions alternately engaging and secured to opposite of said wall sections and with oppositely offset portions of crossed strips disposed at the crossings, forming a plurality of pairs of opposed arches defining passages extending angularly transverse the strips intermediate the wall sections; reinforcing members extending through at least some of the passages; and means for securing said members relative to said wall sections at the crossings of the strips, said means including elements passing through said wall sections, reinforcing members and strips.

14. In a construction of the class described the combination of opposed and spaced wall sections of metal; and an intermediate section including a plurality of crisscrossed corrugated metal strips having longitudinally related oppositely offset portions alternately engaging and secured to opposite of said wall sections and with oppositely offset portions of crossed strips disposed at the crossings, said alternately engaging oppositely offset portions of the respective strips being respectively connected to leading and following offset portions by portions having opposite twists longitudinally of the strips.

15. In a construction of the class described the combination of a pair of adjoining units, each of said units including outer wall sections and an intermediate core section of corrugated sheet material, one of said units having one wall section with a portion extending beyond the edge of the core section therein and the other of said units having the other wall section inset relative to the edge of the core section therein, said wall sections of said units being in abutting relation and said extending portion on one of said units lapping and being bonded to the corrugated sheet material in the other of said units, and reinforcing members extending between said adjoining units and located in passages defined by corrugations in said sheet material.

16. In a construction of the class described the combination of curved inner and outer wall sections; and a curved intermediate section including a plurality of crisscrossed corrugated strips, with the respective strips having longitudinally related portions oppositely offset relative to each other and alternately engaging opposite of said wall sections at an angle to the longitudinal axis of the strips, and with oppositely offset portions of crossed strips being disposed at the crossing.

17. In a construction of the class described the combination of opposed and spaced wall sections; a core section including a plurality of corrugated strips disposed in crisscross relation, respectively having oppositely extending bowed portions located at the crossings, secured to opposite of said wall sections, and defining interior passages and defining exterior valleys at opposite sides of the core section; and supporting members located in at least some of said valleys intermediate said strips and at least one of said wall sections.

18. In a construction of the class described the combination of outer wall sections; and an intermediate core section including a plurality of corrugated strips having longitudinally related bowed portions, said strips being disposed in crisscross relation with oppositely extending bowed portions of crossed strips located at the crossings and respectively engaging the inner surfaces of opposite of the wall sections, said wall sections having indentations in the inner surfaces thereof in the areas where the bowed portions engage the latter.

19. A panel comprising opposed and spaced outer plywood wall sections having longitudinally extending grain therein; and an intermediate core section bonded to said wall sections, said core comprising a pair of corrugated plywood sheets having a center plywood wall therebetween, the corrugations of each sheet being at right angles to the grain of the outer plies thereof, the corrugations extending in opposite directions and at an acute angle to the longitudinal axis of the panel and reinforcing the panel against torsion.

20. A panel comprising opposed and spaced outer plywood wall sections with the grain disposed along one axis of the panel; and an intermediate core section bonded to said wall sections, said core comprising a pair of corrugated plywood sheets having a center plywood wall therebetween, the grain of the center wall being disposed at right angles to the grain of the outer walls, the corrugations of each sheet being at right angles to the grain of the outer plies thereof, the corrugations extending in opposite directions and at an acute angle to the longitudinal axis of the panel and reinforcing the panel against torsion.

21. In a construction of the class described the combination of opposed and spaced wall sections of wood; and an intermediate section including a plurality of criss-crossed corrugated metal strips having longitudinally related oppositely offset portions alternately engaging and secured to opposite of said wall sections and with oppositely offset portions of crossed strips disposed at the crossings, said alternately engaging oppositely offset portions of the respective strips being respectively connected to leading and following offset portions by portions having opposite twists longitudinally of the strips.

22. In a construction of the class described the combination of opposed and spaced wall sections of metal; and an intermediate section including a plurality of crisscrossed corrugated wooden strips having longitudinally related oppositely offset portions alternately engaging and secured to opposite of said wall sections and with oppositely offset portions of crossed strips disposed at the crossings, said alternately engaging oppositely offset portions of the respective strips being respectively connected to leading and following offset portions by portions having opposite twists longitudinally of the strips.

23. In a joint for securing together two abutting panel sections having outer skins and a corrugated core section, joining members shaped to engage the surface of the corrugations disposed within a valley of the corrugations and extending for a short distance on both sides of the joint and secured to each of the core sections and the skin of one section overlying and secured to the core of the other section.

JAMES N. TYNAN.

REFERENCES CITED

The following references are of record in the file of this patent:

UNITED STATES PATENTS

| Number | Name | Date |
|---|---|---|
| 1,148,114 | Morris et al. | July 27, 1915 |
| 1,974,665 | Schnetzer et al. | Sept. 25, 1934 |
| 2,034,489 | Scherer | Mar. 17, 1936 |
| 2,083,165 | Harrap | June 8, 1937 |
| 2,122,479 | London | July 5, 1938 |
| 2,220,596 | Bernhardt | Nov. 5, 1940 |
| 2,223,587 | Verhey | Dec. 3, 1940 |
| 2,234,517 | Coffman | Mar. 11, 1941 |
| 2,288,104 | Pasquier | June 30, 1942 |
| 2,301,538 | Guyer et al. | Nov. 10, 1942 |
| 2,323,105 | Welch | June 29, 1943 |

FOREIGN PATENTS

| Number | Country | Date |
|---|---|---|
| 52,672 | Denmark | Feb. 8, 1937 |
| 628,814 | Germany | Apr. 16, 1936 |